*Liebrich & Witting,*
*Belt Fastener.*
N°37,453.
Fig. 1. Patented Jan. 20, 1863.
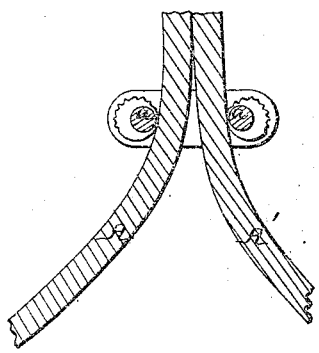
Fig. 2.
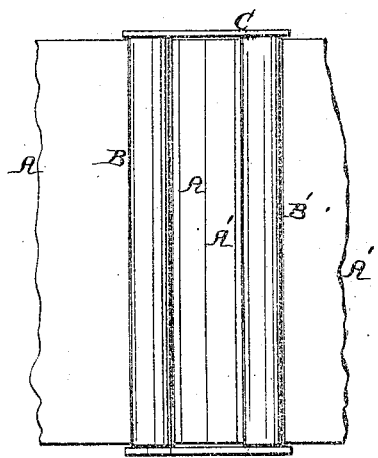
Fig. 3.
Witnesses;
Charles E. Foster
Charles Howson
Inventor;
Henry Howson
Atty for Liebrich & Witting

UNITED STATES PATENT OFFICE.

CONRAD LIEBRICH AND LEONARD UITTING, OF PHILADELPHIA, PENNSYLVANIA.

IMPROVED BELT-FASTENER.

Specification forming part of Letters Patent No. 37,453, dated January 20, 1863.

*To all whom it may concern:*

Be it known that we, CONRAD LIEBRICH and LEONARD UITTING, both of Philadelphia, Pennsylvania, have invented a Belt-Fastener; and we do hereby declare the following to be a full, clear, and exact description of the same, reference being had to the accompanying drawings, and to the letters of reference marked thereon.

Our invention relates to a fastener for belts such as are used for driving machinery; and our invention consists of two plates and two eccentric rollers, each roller having a portion of its surface grooved or serrated, and the whole being arranged for application to the two ends of a belt, as described hereinafter, so as to form a cheap, simple, and secure fastening, by the use of which the length of the belt can be readily adjusted, and the objections experienced in lacing belts and the usual buckle-fastenings avoided.

In order to enable others to make and apply our invention, we will now proceed to describe its construction and operation.

On reference to the accompanying drawing, which form a part of this specification, Figures 1 and 2 are sectional views, and Fig. 3 is a plan view, of our improved belt-fastener.

A and A' represent the two ends of a belt such as used for driving machinery. The improved fastener for securing these ends together consists of the two rollers B and B' and the two plates C and C'. Each roller has at its opposite ends a journal, $a$, one journal being secured to the plate C and the other journal to the plate C' in such a manner that they can turn freely in the said plates. The journals $a a$ of each roller are concentric as regards each other, but eccentric as regards the body of the roller, one portion of the surface of which is so ground as to present a series of longitudinal ribs having sharp edges, as seen in Fig. 1, the other portion of the roller being plain.

In applying our improved fastener to the belt, the rollers B and B' are in the first instance turned to such a position that the greatest width may be presented between them for the admission of the two ends of the strap, (see Fig. 2,) the grooved portion of the rollers being turned outward so as to present no obstruction to the ends of the belt. After these ends have been introduced into the space between the rollers the belt is stretched so as to assume the position shown in Fig. 1, and in thus stretching the belt the two rollers will turn, and, owing to their eccentricity with the journals $a a$, their ribbed portions will approach nearer to each other and compress the two ends of the belt together; at the same time the longitudinal ribs of one roller will indent one end of the belt, while the other is indented by the ribs of the other roller. Thus all slipping of the belt from the fastener is prevented—the more the belt is stretched the more secure being the hold of the fastener on the same. The two ends of the belt being thus secured, the portion which projects beyond the fastener, and which may be considered superfluous, is cut off, so that the belt and fastener will present the appearance illustrated in Fig. 1. Should the belt become slack, it can be readily tightened after first removing it from the pulleys, turning the rollers B and B' to the position shown in Fig. 1, pushing the ends of the belt between the rollers to a distance necessary for taking up the slack, and again stretching the belt so that its ends may be securely confined between the rollers as before.

It will be evident without further description that the above-described device for fastening belts possesses the advantage of simplicity and security, while it affords a much more ready means of adjusting the belt, as regards its length, than the ordinary buckle or the laces heretofore used for the same purpose.

We claim as our invention and desire to secure by Letters Patent—

The plates C and C', and eccentric rollers B and B', each roller having a portion of its surface grooved or serrated, and the whole being arranged for application to the two ends of a belt, as and for the purpose herein set forth.

In testimony whereof we have signed our names to this specification in the presence of two subscribing witnesses.

C. LIEBRICH.
    L. UITTING.

Witnesses:
 I. C. SCHUELLERMAN,
 P. CONRAD.